US009440796B2

(12) United States Patent
Axmann

(10) Patent No.: US 9,440,796 B2
(45) Date of Patent: Sep. 13, 2016

(54) BELT BAND CONVEYOR

(71) Applicant: Axmann Investment GmbH, Sinsheim (DE)

(72) Inventor: Norbert Axmann, Sinsheim (DE)

(73) Assignee: Axmann Investment GmbH, Sinsheim (DE)

( * ) Notice: Subject to any disclaimer, the term of this patent is extended or adjusted under 35 U.S.C. 154(b) by 0 days.

(21) Appl. No.: 14/933,362

(22) Filed: Nov. 5, 2015

(65) Prior Publication Data
US 2016/0176645 A1 Jun. 23, 2016

(30) Foreign Application Priority Data

Dec. 18, 2014 (DE) .................. 10 2014 119 043

(51) Int. Cl.
| B65G 23/12 | (2006.01) |
| B65G 23/04 | (2006.01) |
| B65G 21/16 | (2006.01) |
| B65G 39/16 | (2006.01) |

(52) U.S. Cl.
CPC ..................... *B65G 39/16* (2013.01)

(58) Field of Classification Search
CPC ...... B65G 23/12; B65G 23/04; B65G 21/20; B65G 21/16
USPC .......... 492/39, 40; 193/37; 198/780, 781.07, 198/782, 787, 813
See application file for complete search history.

(56) References Cited

U.S. PATENT DOCUMENTS

| 2,860,766 | A | * | 11/1958 | Welter | ................... | B65G 13/11 |
| | | | | | | 193/37 |
| 4,974,782 | A | * | 12/1990 | Nelson | ................. | G03F 7/0027 |
| | | | | | | 100/162 B |
| 5,011,004 | A | * | 4/1991 | D'Amato | ............ | B65G 47/263 |
| | | | | | | 198/789 |
| 5,156,263 | A | * | 10/1992 | Ledet | ..................... | B65G 23/08 |
| | | | | | | 198/834 |
| 5,848,958 | A | * | 12/1998 | Damkjær | ............... | B65G 39/04 |
| | | | | | | 492/15 |
| 6,073,743 | A | * | 6/2000 | Mefford | ................. | B65G 1/023 |
| | | | | | | 193/35 R |

(Continued)

FOREIGN PATENT DOCUMENTS

| DE | 198 05 204 A1 | 8/1999 |
| DE | 696 05 232 T2 | 7/2000 |

(Continued)

OTHER PUBLICATIONS

German Office Action in 10 2014 119 043.2, dated Aug. 11, 2015, with English translation of relevant parts.

*Primary Examiner* — Douglas Hess
(74) *Attorney, Agent, or Firm* — Collard & Roe, P.C.

(57) ABSTRACT

A belt band conveyor has an endless conveyor belt band guided over deflection and/or drive friction rollers, for deflecting and/or driving the conveyor belt band. Each roller includes an axially-extending shaft. At least three roller segments are releasably mounted on the shaft, axially apart from one another, so as to rotate about a rotational axis extending axially in the longitudinal direction, Each roller segment has an inside circumference contour and a friction surface on its radial outside circumference engaging on the lower belt with friction fit. The inside circumference contour of each roller segment and the outside circumference contour of the shaft are structured so that each roller segment is connected with the shaft with shape fit to prevent twisting about the rotational axis. When the shaft turns about the rotational axis, in a rotational direction, the roller segments also turn about the rotational axis, in this rotational direction.

19 Claims, 2 Drawing Sheets

(56) References Cited

U.S. PATENT DOCUMENTS

| | | | | |
|---|---|---|---|---|
| 6,129,652 | A * | 10/2000 | Wenzel | F16C 13/00 492/46 |
| 6,273,241 | B1 * | 8/2001 | Bonnet | B65G 13/07 198/781.09 |
| 6,471,625 | B1 * | 10/2002 | Jimenez | B31F 1/2863 492/40 |
| 6,502,690 | B1 * | 1/2003 | Specht | B65G 13/07 198/781.07 |
| 6,691,615 | B2 * | 2/2004 | Fukui | H04N 1/0692 101/409 |
| 6,730,008 | B1 * | 5/2004 | Liang | F16C 13/00 492/40 |
| 7,131,295 | B2 * | 11/2006 | Andou | C03B 23/0254 492/16 |
| 7,798,949 | B2 * | 9/2010 | Vaaraniemi | F16C 13/028 492/39 |
| 7,887,041 | B2 * | 2/2011 | Takiguchi | B65H 5/06 271/109 |
| 8,028,874 | B2 * | 10/2011 | Stiles | B60P 3/1066 193/37 |
| 8,409,063 | B2 * | 4/2013 | Ebert | B41F 13/08 226/185 |
| 8,517,181 | B1 * | 8/2013 | Davis | B07B 1/16 209/671 |
| 8,684,058 | B2 * | 4/2014 | Byerley | B29D 30/28 156/130.3 |
| 9,061,833 | B2 * | 6/2015 | Froebus | B65G 23/08 |
| 2005/0199474 | A1 | 9/2005 | Axmann | |

FOREIGN PATENT DOCUMENTS

| | | |
|---|---|---|
| DE | 10 2004 012 344 A1 | 10/2005 |
| EP | 0 829 654 A2 | 3/1998 |
| JP | 2011-37576 A | 2/2011 |
| JP | 2012-6688 A | 1/2012 |

* cited by examiner

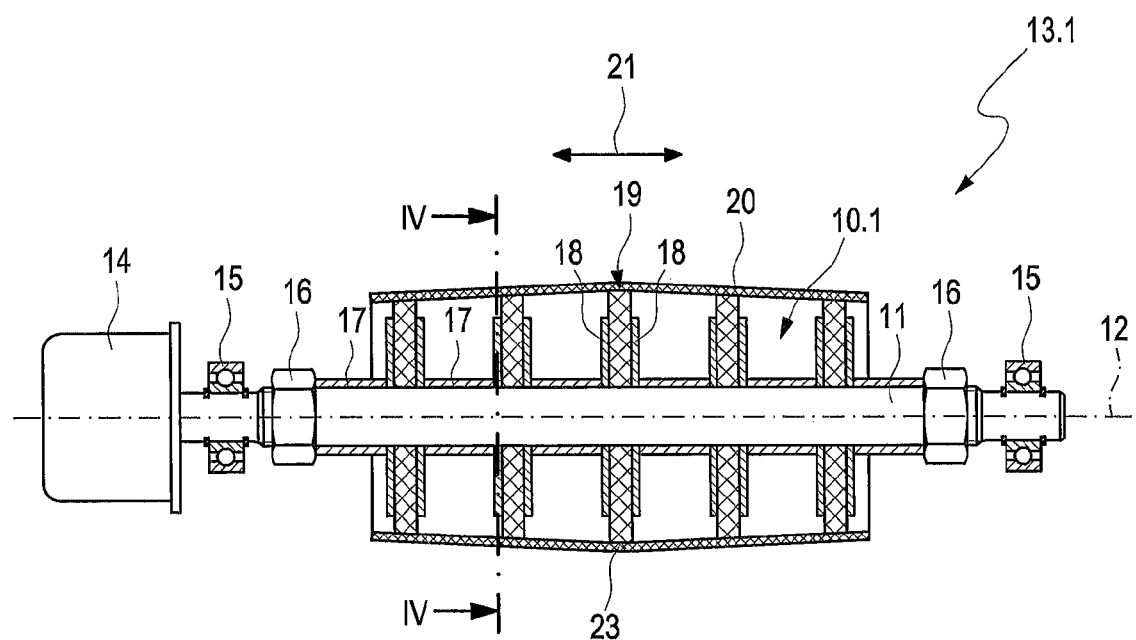
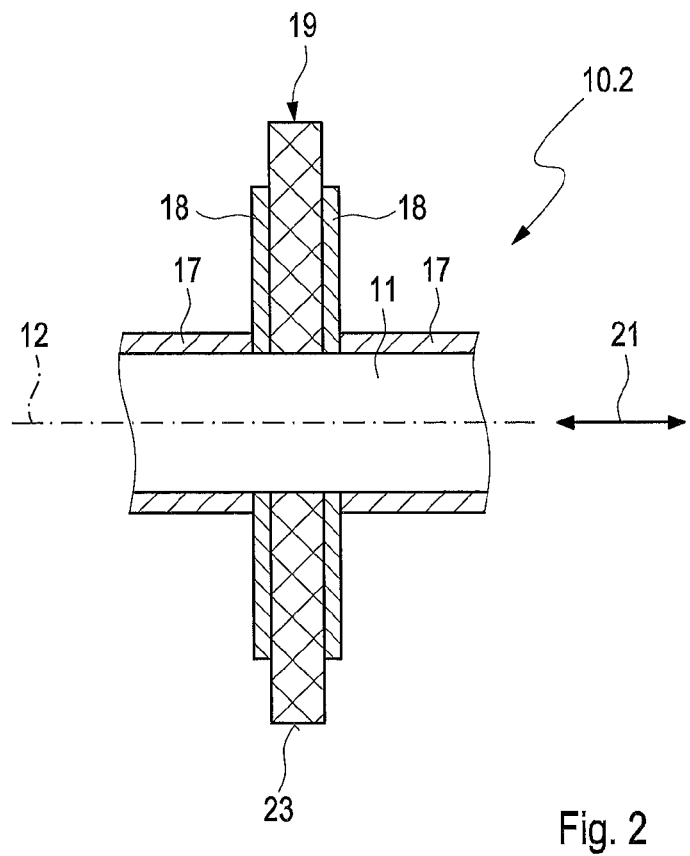

BELT BAND CONVEYOR

CROSS REFERENCE TO RELATED APPLICATIONS

Applicant claims priority under 35 U.S.C. §119 of German Application No. 10 2014 119 043.2 filed Dec. 18, 2014, the disclosure of which is incorporated by reference.

BACKGROUND OF THE INVENTION

1. Field of the Invention

The invention relates to a belt band conveyor having an endless conveyor belt band, preferably motor-driven, that is guided over deflection friction rollers and/or over drive friction rollers, preferably motor-driven, with its lower belt, for deflecting and/or driving the conveyor belt band.

The rollers each comprise a shaft that extends in a longitudinal direction, which shaft has an outside circumference contour, wherein at least three roller segments are mounted on the shaft, which segments are disposed axially adjacent, in each instance, in the longitudinal direction, at an axial distance from one another, and wherein each roller segment of the roller segments is mounted so as to rotate about an axis of rotation that extends axially in the longitudinal direction, and has an inside circumference contour, and wherein each roller segment of the roller segments has a friction surface that runs around the axis of rotation, in the circumference direction, on its radial outside circumference, and wherein each roller segment of the roller segments engages on the lower belt of the conveyor belt band exclusively with friction fit, by way of the respective friction surface.

2. Description of the Related Art

Belt conveyors essentially consist of a drive drum and a deflection drum. The materials are the shaft or axle with pipe mantle and roller inserts such as fixed inserts or also bearing housings. The drive drum is generally provided with a lining composed of a skid-resistant belt material, or also with a rubber coating or similar material. The coating ensures a greater friction factor and thereby greater skid resistance between the drive drum and the belt. Furthermore, the skid resistance serves to reduce the tension of the belt, and this tension reduction can lead to a longer useful lifetime of the belt material.

The deflection drum and drive drum are similar in structure at the manufacturers, and have been complicated, in unchanged manner, for many years. For example, the drum of straight belt conveyors or of straight belts must be re-worked by means of a lathe tool, for example, in order to produce a certain convexity. The convexity is necessary to prevent the belt from slipping off at the side. Lathing off or grinding off of the drum coating, in order to achieve the convexity, is also complicated. In simple application cases, it is also sufficient, for cost reasons, to increase the height of the drum at the center, by mean of a skid-resistant lining, in order to hold the belt in the center, using this method.

Deflection drums and drive drums of curved belts are particularly complicated. Curved belts require conical rollers, because the belt runs faster on the outside than on the inside, and this difference must be balanced out using the conical roller. Frequently, common drive shafts or deflection shafts have a plastic cast around them conically. The roller, which has been conically cast or conically recast in this manner, is then ground off, and then the ends are re-worked once again, with chip removal.

All the embodiments have in common that they are very complicated in terms of production. Often, the drum already makes up a significant percentage of the production costs of a belt conveyor.

Belt band conveyors having the characteristics mentioned initially have become known, for example, from DE 198 05 204 A1 and DE 10 2004 012 344 A1. In the case of these belt band conveyors, it can be provided that the running rollers and/or the deflection rollers are formed, in each instance, by a roller axle or roller mounted on the side cheek of the belt band conveyor, axially adjacent to and independent of one another, preferably freely rotatable. In the exemplary embodiments described there, drive of the conveyor belts takes place by means of a drive unit disposed below the lower belt run, by means of a motor-driven friction wheel, which interacts with the lower belt run with friction fit. According to DE 10 2004 012 344, however, the drive of the conveyor belts can also take place directly by way of the running rollers and/or by way of the deflection rollers, with friction fit or force fit. Furthermore, drive can also take place with shape fit there. For this purpose, engagement elements can be provided on the drive side, which elements interact with engagement elements on the power take-off side, which in turn are attached to the conveyor belt. These designs are also relatively complicated and correspondingly expensive. Furthermore, transfer of force and moment by the roller segments that can rotate about the shaft independent of one another is not possible, or possible only insufficiently.

SUMMARY OF THE INVENTION

It is therefore an object of the invention to provide a belt band conveyor of the type mentioned initially, in which the above disadvantages are avoided, particularly in which simple and quick assembly and disassembly of the roller segments, if applicable also of further components disposed on the shaft, also for the purpose of their replacement, is just as well possible as improved or optimal transfer of force or torque.

These and the other objects are accomplished, in surprisingly simple manner, by a belt band conveyor according to the invention, particularly in that the roller segments are set onto the shaft in axially releasable manner, so that the roller segments can be axially pulled off or pulled out of the shaft, and that the inside circumference contour of each roller segment and the outside circumference contour of the shaft assigned to it are structured to be coordinated with one another in such a manner that each roller segment is connected with the shaft, preferably with slight radial play, with shape fit to prevent twisting about the axis of rotation, so that when the shaft turns about the axis of rotation, in a direction of rotation, the roller segments also turn about the axis of rotation, in this direction of rotation.

According to a preferred embodiment, it can be provided that the inside circumference contour of the respective roller segment corresponds to the outside circumference contour of the shaft that is assigned to it.

According to a preferred further development, it can be provided that at least one spacer sleeve, preferably composed of metal, is disposed between two axially adjacent roller segments of the roller segments, in each instance, which sleeve is connected by being set onto the shaft in axially releasable manner.

In this connection, each spacer sleeve may be configured as a round tube having a circular ring cross-section. Such spacer sleeves are available or can be produced in particularly cost-advantageous manner.

Alternatively, each spacer sleeve may have an inside circumference contour that runs around the axis of rotation, which contour is structured to be coordinated with the outside circumference contour of the shaft, which contour is assigned to it and runs around the axis of rotation, in such a manner that the respective spacer sleeve is connected with the shaft, preferably with slight radial play, with shape fit, to prevent twisting about the axis of rotation. In this way, a torque can also be passed on by the shaft by way of the respective spacer sleeve, to the respective roller segment, by way of the axial side surfaces of the latter, which face away from one another.

In this connection, in particularly preferred manner, the inside circumference contour of each spacer sleeve may correspond to the outside circumference contour of the shaft that runs around the axis of rotation.

According to a preferred embodiment, multiple support disks, preferably composed of metal, particularly of sheet metal, may be axially releasable for lateral support of the respective roller segment, wherein each support disk of the support disks extends away from the shaft, transverse or perpendicular to the axis of rotation, and wherein each roller segment of the roller segments is delimited by a first axial side surface and by a second axial side surface that faces axially away from the former in the longitudinal direction, and wherein a first support disk of the support disks, in each instance, lies against the respective first axial side surface of the respective roller segment, and a second support disk of the support disks, in each instance, lies against the respective second axial side surface of the respective roller segment.

In this connection, preferably each support disk may have an inside circumference contour that runs around the axis of rotation, which contour is structured to be coordinated with an outside circumference contour of the shaft, which contour is assigned to the former and runs around the axis of rotation, so that the respective support disk is connected with the shaft, preferably with slight radial play, with shape fit, to prevent twisting about the axis of rotation.

In this connection, very preferably the inside circumference contour of each support disk may correspond to the outside circumference contour of the shaft, which contour runs around the axis of rotation.

According to a particularly preferred embodiment, the roller segments and the spacer sleeves are axially braced against one another in the longitudinal direction, directly or indirectly, by means of at least one clamping means attached to the shaft.

According to a particularly preferred exemplary embodiment, each roller segment of the roller segments is axially clamped in between the respective first support disk and the respective second support disk, by means of at least one or the clamping means attached to the shaft, and wherein each spacer sleeve is axially clamped in between the second support disk pressed against the second axial side surface of a first roller segment and the first support disk pressed against the first axial side surface of a second roller segment disposed axially adjacent, by means of the at least one clamping means attached to the shaft.

Preferably, the clamping means can be a nut having an inside thread, by way of which the nut is screwed onto an outside thread of a threaded segment of the shaft.

In a preferred embodiment, the shaft is a polygonal shaft, particularly a square shaft or a hexagonal shaft, and that the roller segments each have an axial passage opening having a corresponding polygonal inside cross-section, particularly a corresponding square or hexagonal cross-section.

According to a preferred further development, the friction surface of the respective roller segment and/or the respective roller segment is made up of a wear-resistant plastic.

According to a very particularly preferred exemplary embodiment, the friction surface of the respective roller segment and/or the respective roller segment is made up of polyurethane elastomer or of polyester urethane rubber.

A particularly simple and cost-advantageous design can be achieved by structuring each roller segment as a disk, particularly as a circular disk.

Preferably, each disk can have an axial thickness and a radial width that is greater than the axial thickness. In this way, costs can be minimized due to material savings.

According to a further development, particularly alternatively or in addition, the friction surface of each roller segment may be structured to be circular-cylindrical. In this way, costs can be further minimized.

According to a preferred embodiment, the roller segments have an outside diameter that is of a different size from that spanned by the respective friction surface.

According to a preferred embodiment, a central roller segment of the roller segments is disposed, viewed in the longitudinal direction, for example in the region of a longitudinal center or in a longitudinal center of the shaft, the outside diameter of which segment is greater, preferably slightly greater, than the respective outside diameter of the roller segments disposed axially adjacent to the central roller segment or of all the other roller segments. In this way, the roller segments of the respective deflection friction roller and/or drive friction roller can impart a kind of convex outside contour, viewed in a cross-section that contains the longitudinal axis. This embodiment variant can preferably be used for straight belts or for straight belt conveyors.

According to a very particularly preferred embodiment variant, the outside diameter of the roller segments disposed along the shaft at an or the axial distance relative to one another, proceeding from a first roller segment that is disposed at a first shaft end of the shaft, viewed in the direction of a second shaft end of the shaft that extends axially away from the first shaft end in the longitudinal direction, from roller segment to roller segment, is configured to be constantly larger or constantly smaller than the outside diameter of the respective previous axially adjacent roller segment. In this way, viewed in a cross-section that contains the longitudinal axis, the roller segments of the respective deflection friction roller and/or drive friction roller can impart a kind of conical outside contour. This embodiment variant can preferably be used for curved belt conveyors.

According to a very particularly preferred exemplary embodiment, the roller segments or disks are produced by water-jet cutting. Such cutting makes production with low tolerances possible, in particularly cost-advantageous manner. Particularly if the particularly preferred highly wear-resistant plastic polyurethane elastomer or polyester urethane rubber is used for the roller segments or for the disks, it is possible to proceed, in particularly cost-advantageous manner, from panel-shaped plastic semi-finished products from which the roller segments or roller disks can be cut out, by means of water-jet cutting, in simple and very particularly cost-advantageous as well as precise manner.

According to a preferred embodiment variant, the belt band conveyor comprises a motor drive that is coupled with the shaft, so that the shaft can rotate or is rotated about the axis of rotation, by means of the motor drive, together with the roller segments connected with the shaft with shape fit, wherein the conveyor belt band is exclusively driven by way of the roller segments that engage on the lower belt, exclusively with friction fit.

The belt band conveyor can be a straight belt conveyor or a belt conveyor comprising a straight belt, or a curved belt conveyor or a belt conveyor comprising a curved belt.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 is a side view of a detail of a belt band conveyor configured according to a first exemplary embodiment, having a drive friction roller and deflection friction roller according to the invention, which is structured as a straight belt conveyor;

FIG. 2 is an enlarged axial section in the region of a roller segment of the roller segments of the drive friction roller and deflection friction roller according to FIG. 1;

DETAILED DESCRIPTION OF PREFERRED EMBODIMENTS

Figure 3:
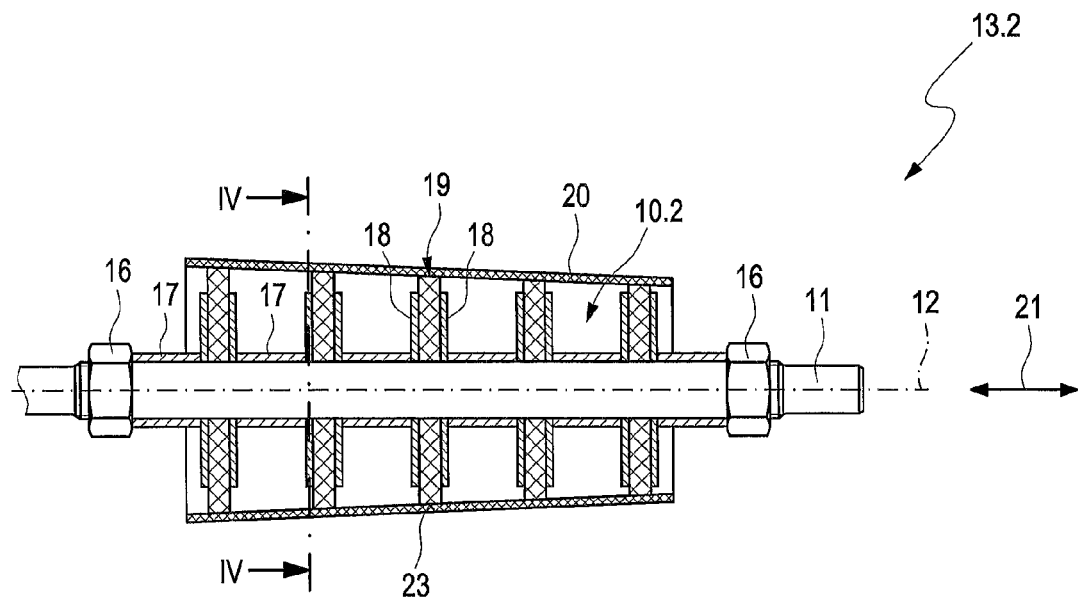
FIG. 3 is a side view of a detail of a belt band conveyor configured according to a second exemplary embodiment, having a drive friction roller and deflection friction roller according to the invention, which is structured as a curved belt conveyor.

Referring now in detail to the drawings, each belt band conveyor 13.1, 13.2 shown in FIGS. 1 and 3 comprises an endless conveyor belt band 20 that is guided over deflection friction rollers as well as over drive friction rollers and deflection friction rollers 10.1, 10.2, with its lower belt, for deflecting or driving the conveyor belt band 20. In the figures, a drive friction roller and deflection friction roller 10.1, 10.2 can be driven or is driven by means of a drive motor, for friction-fit drive and deflection of the respective conveyor belt band 20. In FIG. 1, an electric drive motor 14 is shown as an example. Without the drive motor and without the friction roller being drivable, the friction roller would be a pure deflection friction roller. In FIG. 3, no drive motor is shown. Nevertheless, even there a drive friction roller and deflection friction roller 10.2 that can be driven by means of a drive motor is shown there. There, too, the friction roller would be a pure deflection friction roller, in any case as long as no drive motor were coupled with the shaft and as long as the shaft would not be drivable.

A deflection friction roller disposed at the other end of the respective conveyor belt band 20 is not shown in the figures. Preferably, this deflection friction roller, preferably with the exception of the related shaft, can have essentially the same or the same structure as the respective drivable or driven drive friction roller and deflection friction roller 10.1, 10.2.

Each drive friction roller and deflection friction roller 10.1, 10.2, preferably also each deflection friction roller, comprises a shaft 11 that extends axially in a longitudinal direction 21. The shaft 11 is mounted on bearings 15, in each instance, so as to rotate about its axis of rotation 12. A plurality of five roller segments 19 here, in each instance, is mounted on the shaft 11. The roller segments 19 are disposed axially adjacent, in each instance, in the longitudinal direction 21, at an axial distance from one another, and are set onto the shaft 11 in axially releasable manner. The axial distance between two axially adjacent roller segments 19 is the same size, here. It is understood, however, that the axial distance between two axially adjacent roller segments can also be of different sizes.

Each roller segment 19 has a friction surface 23 that runs around the axis of rotation 12, in the circumference direction, on its radial outside circumference, which surface engages on the lower belt of the conveyor belt band 20 exclusively with friction fit. Each roller segment 19 engages on the lower belt of the respective conveyor belt band 20 exclusively with friction fit, by way of the respective friction surface 23.

Each roller segment 19 has an inside circumference contour that runs around the axis of rotation 12 in the circumference direction, which contour corresponds to the outside circumference contour of the shaft 11 that runs around the axis of rotation 12 in the circumference direction. According to the invention, it is provided that the roller segments 19 are set onto the shaft 11 in axially releasable manner, and that the inside circumference contour of each roller segment 19 and the outside circumference contour of the shaft 11 assigned to it are structured to be coordinated with one another in such a manner that each roller segment 19 is connected with the shaft 11 with shape fit to prevent twisting about the axis of rotation 12, so that when the shaft 11 turns about the axis of rotation 12, in a direction of rotation, the roller segments 19 also turn about the axis of rotation 12, in this direction of rotation.

Figure 4:
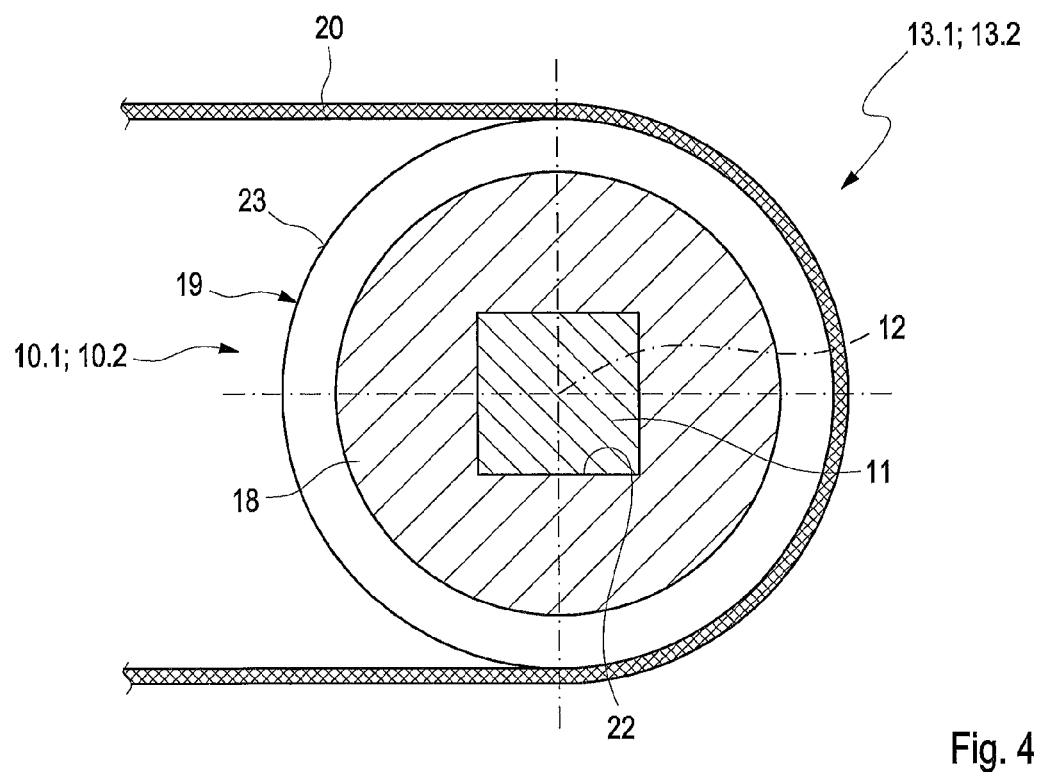
FIG. 4 is an enlarged cross-section in the region of a roller segment of the roller segments of the drive friction rollers and deflection friction rollers, structured as a disk.

For this purpose, in the exemplary embodiments shown it is provided, among other things, that the inside circumference contour of the respective roller segments 19 corresponds to this outside circumference contour of the shaft 11 that is assigned to it. In concrete terms, it is provided, in the exemplary embodiments shown, that the shaft 12 is a square shaft, which has a square cross-section in the region of the roller segments 19 (see FIG. 4). Accordingly, each roller segment 19 has an axial passage opening 22 having a corresponding square inside cross-section, by way of which opening the respective roller segment 19 is set onto the square shaft 11, with slight radial play, in axially releasable manner.

Multiple support disks 18, in each instance, are set onto the square shaft 11 for lateral support of the respective roller segment 19, also with slight radial play on the square shaft 11, in axially releasable manner. Each support disk 18 of the support disks 18 extends away from the shaft 11, perpendicular to the axis of rotation 12. Each roller segment 19 of the roller segments 19 is delimited by a first axial side surface and by a second axial side surface that faces axially away from the former in the longitudinal direction 21, which surfaces run parallel to one another. A first support disk 18 of the support disks 18, in each instance, lies against the respective first axial side surface of the respective roller segment 19, and a second support disk 18 of the support disks 18, in each instance, lies against the respective second axial side surface of the respective roller segment 19.

Each support disk 18 also has an inside circumference contour that runs around the axis of rotation 12 in the circumference direction, which is structured, in each instance, to be coordinated with the outside circumference contour of the shaft 11 that runs around the axis of rotation 12 in the circumference direction, in such a manner that the respective support disk 18 is connected with the shaft 11 with shape fit, to prevent twisting about the axis of rotation 12. For this purpose it is provided, in the exemplary embodiments according to the invention, that the inside circumference contour of each support disk 18 corresponds to the outside circumference contour of the shaft 11. Each support disk 18 has an axial thickness. The thickness can amount to 2 mm, for example. Each support disk 18 preferably consists of metal, particularly of steel sheet.

Multiple spacer sleeves 17 are also set onto the shaft 11, in axially releasable manner, wherein a spacer sleeve 17 of the spacer sleeves 17 is disposed between two axially adjacent roller segments 19 of the roller segments 19, in each instance. In the exemplary embodiments shown, a single spacer sleeve 17 is disposed between two axially adjacent roller segments 19 of the roller segments 19, in each instance. This sleeve lies against an axial side surface of a support disk 18 of the support disks 18 with its two axial ends, in each instance. Each spacer sleeve 17 also has an inside circumference contour that runs around the axis of rotation 12 in the circumference direction, which contour is structured, in each instance, coordinated with the outside circumference contour of the shaft 11 that is assigned to it, in such a manner that the respective spacer sleeve 17 is connected with the shaft 11 with shape fit, to prevent twisting about the axis of rotation 12.

For this purpose it is provided, in the exemplary embodiments according to the invention, that the inside circumference contour of each spacer sleeve 17 corresponds to the outside circumference contour of the shaft 11.

Preferably, the spacer sleeves 17 consist of metal. The spacer sleeves 17 have a preferably essentially constant wall thickness. The wall thickness can amount to 2 mm, for example. The spacer sleeves 17 have an axial length that is the same here. This axial length can amount to 35 mm, for example. It is understood, however, that spacer sleeves having a differently great axial length can also be used.

Each roller segment 19 of the roller segments 19 is axially clamped in between the respective first support disk 18 and the respective second support disk 18, by means of at least one clamping means 16 attached to the shaft 11. Each spacer sleeve 17 is axially clamped in between a support disk 18 pressed against an axial side surface of a first roller segment 19 and a support disk 18 pressed against an axial side surface of a second roller segment 19 disposed axially adjacent, by means of the at least one clamping means 16 attached to the shaft 11. In the exemplary embodiments shown, a clamping means 16 is attached to the shaft 11 in the region of the two shaft ends that face away from one another, in each instance. The clamping means is a nut 16 having an inside thread, in each instance. Each nut 16 is screwed onto an outside thread of a threaded segment of the shaft 11 by way of its inside thread, and tightened.

Each roller segment 19 is a disk, which can also be referred to as a rotating disk. Preferably, each disk 19 is a circular disk having a round outside diameter. Each disk 19 has an axial thickness and a radial width that is greater than the axial thickness. The axial thickness of the disks 19 can amount to 10 mm or 12 mm, for example. This slight disk thickness is completely sufficient to guarantee sufficient rigidity of the roller segments or disks 19. This is true because the roller segments or disks 19 are laterally supported or held by the support disks 18 composed of metal, for example of steel, which can also be referred to as holding disks. The holding disks or support disks 18 are held by way of the spacer sleeves 17, which are tubes, preferably thin-walled tubes. The unit composed of roller segments or disks 19, holding disks or support disks 18, and spacer sleeves 17 is axially pressed together by means of the nuts 16. This action is done by tightening the nuts 16. The nuts 16 can be hexagonal nuts, for example.

Each roller segment or each disk 19 consists of a highly wear-resistant and "skid-resistant" plastic. Preferably, each roller segment or each disk 19 consists of a solid polyester urethane rubber.

The friction surface 23 of each disk 19, which spans the respective outside diameter, is configured to be circular-cylindrical. Preferably, the outside diameters of the roller segments or disks are of different sizes.

In the case of the straight belt conveyor 13.1 shown in FIG. 1, a central roller segment 19 of the roller segments 19 is provided, viewed in the longitudinal direction 21. The outside diameter of the central roller segment 19 is slightly greater than the respective outside diameter of all the other roller segments 19. The outside diameter of the central roller segment 19 can amount to 81 mm, for example, and the outside diameters of the two axially adjacent roller segments 19 can each amount to 80.5 mm, and the outside diameters of the roller segments 19 that are in turn axially adjacent, here the outermost, can each amount to 80 mm.

The outside diameters of the other roller segments 19, disposed axially offset in the longitudinal direction 21 and at a distance from one another, in directions facing away from one another proceeding from the central roller segment 19, are slightly smaller than the outside diameter of the respective preceding axially adjacent roller segment 19, from roller segment 19 to roller segment 19, proceeding from the central roller segment 19, viewed in the direction toward the respective shaft end of the shaft 11.

To state it in different words, the roller segment 19 having the greatest outside diameter is disposed in the center, and the outside diameters of the other roller segments 19, disposed axially 21 to the side of it, at a distance, are structured to become smaller, viewed toward the sides. In this manner, a kind of "convexity" of the drive friction roller and deflection friction roller 10.1 as a whole can be achieved.

In contrast to the straight belt conveyor 13.1 shown in FIG. 1, in the case of the curved belt conveyor 13.2 shown in FIG. 3, the outside diameter of the roller segments 19 disposed along the shaft 11 axially adjacent in the longitudinal direction 21, at the axial distance relative to one another, proceeding from the first roller segment 19 shown on the left in FIG. 3, which is assigned to the first shaft end of the shaft 11 here, for example the drive-side shaft end of the shaft 11, viewed in the direction of the second shaft end of the shaft 11 that extends axially away from the first shaft end in the longitudinal direction 21, from roller segment 19 to roller segment 19, is configured to be constantly larger or constantly smaller than the outside diameter of the respective "previous" axially adjacent roller segment 19. In this way, a kind of "conicity" of the drive friction roller and deflection friction roller 10.2 as a whole can therefore be achieved.

In other words, in the case of a curved belt drum, the outside diameters of the roller segments can be designed to be the largest on the outside and decreasing toward the inside, corresponding to the curve radius of the belt curve.

The roller segments 19 of the friction roller 10.2 shown in FIG. 3 are disposed symmetrical to a vertical plane of symmetry that is configured perpendicular to the axis of rotation 12 and contains the axial center of the central roller segment.

Although several embodiments of the present invention have been shown and described, it is to be understood that many changes and modifications may be made thereunto without departing from the spirit and scope of the invention.

What is claimed is:

1. A belt band conveyor comprising:
   (a) an endless conveyor belt band comprising a lower belt,
   (b) a plurality of friction rollers selected from the group consisting of deflection friction rollers for deflecting the conveyor belt band and drive friction rollers for driving the conveyor belt band, wherein the friction rollers are guided over the lower belt; and
   (c) a shaft extending in a longitudinal direction and having an outside circumference contour;
   wherein each friction roller comprises at least three roller segments mounted on the shaft in axially releasable manner and disposed axially adjacent at an axial distance from one another in the longitudinal direction;
   wherein each roller segment has an inside circumference contour and is mounted so as to rotate about an axis of rotation that extends axially in the longitudinal direction;
   wherein each roller segment has a respective friction surface on a radial outside circumference of the roller segment;
   wherein each roller segment engages on the lower belt of the conveyor belt band exclusively with friction fit by way of the respective friction surface; and
   wherein the inside circumference contour of each roller segment and the outside circumference contour of the shaft are structured to be coordinated with one another so that each roller segment is connected with the shaft with shape fit to prevent twisting about the axis of rotation so that when the shaft turns about the axis of rotation in a direction of rotation, the roller segments also turn about the axis of rotation in the direction of rotation; and
   wherein multiple support disks are set on in axially releasable manner for lateral support of each roller segment, wherein each support disk of the support disks extends away from the shaft, transverse or perpendicular to the axis of rotation, and wherein each roller segment of the roller segments is delimited by a first axial side surface and by a second axial side surface that faces axially away from the first axial side surface in the longitudinal direction, and wherein a first support disk of the support disks, in each instance, lies against the respective first axial side surface of the respective roller segment, and a second support disk of the support disks, in each instance, lies against the respective second axial side surface of the respective roller segment.

2. The belt band conveyor according to claim 1, wherein the inside circumference contour of each roller segment corresponds to the outside circumference contour of the shaft.

3. The belt band conveyor according to claim 1, wherein at least one spacer sleeve is disposed between two axially adjacent roller segments of the roller segments, in each instance, wherein the at least one spacer sleeve is set onto the shaft in axially releasable manner.

4. The belt band conveyor according to claim 3, wherein the at least one spacer sleeve has an inside circumference contour that is structured to be coordinated, in each instance, with the outside circumference contour of the shaft, in such a manner that the at least one spacer sleeve is connected with the shaft with shape fit, to prevent twisting about the axis of rotation.

5. The belt band conveyor according to claim 4, wherein the inside circumference contour of the at least one spacer sleeve corresponds to the outside circumference contour of the shaft.

6. The belt band conveyor according to claim 3, wherein the roller segments and the at least one spacer sleeve are axially braced against one another in the longitudinal direction, directly or indirectly, by at least one clamp attached to the shaft.

7. The belt band conveyor according to claim 6, wherein the clamp is a nut having an inside thread for screwing the nut onto an outside thread of a threaded segment of the shaft.

8. The belt band conveyor according to claim 1, wherein each support disk has an inside circumference contour that is structured to be coordinated with the outside circumference contour of the shaft so that the respective support disk is connected with the shaft with shape fit, to prevent twisting about the axis of rotation.

9. The belt band conveyor according to claim 8, wherein the inside circumference contour of each support disk corresponds to the outside circumference contour of the shaft.

10. The belt band conveyor according to claim 1, wherein each roller segment of the roller segments is axially clamped in between the respective first support disk and the respective second support disk, by at least one clamping means attached to the shaft, and wherein at least one spacer sleeve is axially clamped in between the second support disk pressed against the second axial side surface of a first roller segment of the roller segments and the first support disk pressed against the first axial side surface of a second roller segment of the roller segments disposed axially adjacent, by the at least one clamp attached to the shaft.

11. The belt band conveyor according to claim 1, wherein the shaft is a polygonal shaft, and wherein each roller segment has a respective axial passage opening having a corresponding polygonal inside cross-section.

12. The belt band conveyor according to claim 1, wherein the friction surface of the respective roller segment and/or that the respective roller segment comprises a wear-resistant plastic.

13. The belt band conveyor according to claim 1, wherein the friction surface of the respective roller segment comprises a polyurethane elastomer or a polyester urethane rubber.

14. The belt band conveyor according to claim 1, wherein each roller segment is structured as a disk.

15. Belt band conveyor according to claim 14, wherein each disk has an axial thickness and a radial width that is greater than the axial thickness.

16. The belt band conveyor according to claim 1, wherein the friction surface of each roller segment is structured to be circular-cylindrical.

17. The belt band conveyor according to claim 1, wherein the roller segments have an outside diameter that is of a different size from that spanned by the respective friction surface.

18. The belt band conveyor according to claim 17, wherein a central roller segment of the roller segments is provided, viewed in the longitudinal direction, wherein the outside diameter of the central roller segment is greater than the respective outside diameter of the roller segments disposed axially adjacent to the central roller segment.

19. The belt band conveyor according to claim 17, wherein the outside diameter of the roller segments disposed along the shaft at an axial distance relative to one another, proceeding from a first roller segment that is disposed at a first shaft end of the shaft, viewed in the direction of a second shaft end of the shaft that extends axially away from the first shaft end in the longitudinal direction, from roller segment to roller segment, is configured to be constantly larger or constantly smaller than the outside diameter of the respective previous axially adjacent roller segment.

* * * * *